Sept. 8, 1953 A. J. WARNER ET AL 2,651,566
METHODS AND APPARATUS FOR GROWING CRYSTALS
Filed Feb. 11, 1950 2 Sheets-Sheet 1

Inventors
ARTHUR J. WARNER
STANLEY G. FOORD

By Percy P. Lantry
Attorney

Sept. 8, 1953   A. J. WARNER ET AL   2,651,566
METHODS AND APPARATUS FOR GROWING CRYSTALS
Filed Feb. 11, 1950   2 Sheets-Sheet 2

Inventors
ARTHUR J. WARNER
STANLEY G. FOORD

By Percy P. Lantz
Attorney

Patented Sept. 8, 1953

2,651,566

UNITED STATES PATENT OFFICE 2,651,566

METHODS AND APPARATUS FOR GROWING CRYSTALS

Arthur James Warner and Stanley George Foord, London, England, assignors to International Standard Electric Corporation, New York, N. Y.

Application February 11, 1950, Serial No. 143,688
In Great Britain February 14, 1949

3 Claims. (Cl. 23—301)

This invention relates to methods of and apparatus for growing crystals from a nutrient solution which methods and apparatus are particularly suitable for the simultaneous growing of large crystals in quantity.

It is well known to grow individual crystals from a solution by suspending individual crystal nuclei in a solution saturated at a convenient temperature and gradually reducing the temperature of the solution at such a rate that the excess of solute existing as a result of the reduced temperatures is deposited uniformly on each nucleus. This method, known as the "falling temperature method," is particularly useful for growing crystals of substances having a fairly rapid increase in solubility with temperature, whose actual solubility is sufficiently high to give a reasonable growth rate and where very large crystals, or a large number of crystals per unit volume of solution, are not of primary concern. Simple inorganic crystals such as copper sulphate pentahydrate, nickel sulphate septahydrate, sodium chlorate, beryllium sulphate and so forth, as well as certain water soluble organic compounds such as Rochelle salt can be conveniently grown on a laboratory scale by the "falling temperature method."

It is also known to grow individual crystals by what may be termed a "constant temperature circulating solution" method. In this method, solution is circulated round a system comprising two vessels in communication with one another through pipe lines and maintained at a predetermined temperature difference. The solution in the warmer or dissolving vessel is maintained in a substantially saturated condition, e. g. by being kept in contact with undissolved solute and the crystals are grown in a growing vessel maintained at a lower temperature so that solution flowing into it through a filter from the dissolving vessel is in a supersaturated condition.

An additional vessel may be used through which the saturated solution passes and which is maintained at a temperature higher than that of the dissolving vessel so as to ensure the solution of any crystalline matter which may come through the filter. The solution from the dissolving vessel, after passing through the additional vessel maintained at a higher temperature if such additional vessel is used, is pumped into the growing vessel, which as stated above is maintained at a lower temperature than that of the dissolving vessel.

By this "constant temperature method" it is possible, by suitable choice of temperature, to grow large, perfect, single crystals of a variety of materials. It has the advantage over the "falling temperature method" that the size or number of crystals grown is not a function of the actual solubility difference between two temperatures, but depends only on the size of the container and the length of time that the plant can be run without shutdown, and since the crystal growth takes place at a fixed temperature, crystals of materials showing a tendency to decompose in solution at elevated temperatures can be successfully grown.

For example, it is possible to grow crystals of ethylene diamine tartrate by the falling temperature method, but certain facts limit the practicability of the method for this particular material. Ethylene diamine tartrate forms a well defined monohydrate which is stable at temperatures below 41° C. Therefore any falling temperature method must be terminated before the temperature of formation of the unwanted monohydrate is reached. At elevated temperatures of 55° C. and above ethylene diamine tartrate solutions tend to form condensation products of at present unknown composition, which accumulate in the system and ultimately cause loss of material, and poor growth of the crystal.

If the "falling temperature" method is used with ethylene diamine tartrate it is therefore best to operate between 55° C. and 41° C. which difference of temperature results in the formation of approximately 40 kilograms of crystal per 450 litres of solution. Assuming that one wishes to grow crystals weighing approximately 450 grams apiece this means in practice that a maximum number of about 85 crystals can be grown in a 450 litre tank. This process might be convenient for experimental purposes but it is not the most economical for commercial production. By way of contrast, if the "constant temperature circulating solution" method is used a most convenient growth of crystal occurs with a super-saturation of 2.5° C. and a growing temperature of 42.5° C. Under these conditions, starting with a suitable seed of 50–70 grams, crystals of approximately 450 grams can be grown in ten weeks, provided solute is added to the vessel containing saturated solution to maintain such saturation. The number of crystals which can be grown per tank is a function of the spacing of the crystals in relation to one another and it is possible to grow approximately 150 crystals in a 450 litre vessel, a great improvement in production over the "falling temperature" method.

Known methods and apparatus for the "constant temperature circulating solution" method have, however, been found to have many practical drawbacks. In carrying out the known method it is observed that in order to keep the solution in the dissolving vessel in a constant state of saturation it is necessary to add solute from time to time during the growing period and that as the crystal seeds grow the amount of solute necessary to be added per unit of time increases markedly as the growth proceeds. To avoid any possibility of lack of excess solute it is therefore necessary to watch the process most carefully during the latter part of the run. Also since the viscosity and density of the solution in the dissolving vessel is relatively high, small crystals of the solute tend to remain in suspension, especially if the agitation is vigorous, and these small crystals, together with any adventitious dirt, tend to collect on the filter element in the dissolving vessel, impeding the free flow to the growing vessel, and eventually leading to stoppage of the flow thus necessitating periodic cleaning.

Any interruption in the smooth operation of the process, such as that caused by filter blockage or lack of excess solute, even though it be for a relatively short time as regards the total time of crystal growing, causes flaws (veils) to be formed in the growing crystal which makes the amount of useful material obtainable from the crystal smaller than would be the case were uninterrupted growth to take place.

The rate of addition of solute may be preset in accordance with the rate of growth of the crystals with a known degree of supersaturation as determined over the entire growing period by experiment.

Since, however, the depletion of solute from the nutrient solution by the growth of crystals changes the concentration of the solution and thus such factors as density, viscosity and the like, the addition of solute may be controlled automatically by an indication of a significant factor of the solution. In the case of ethylene diamine tartrate, for example, the viscosity of the solution is markedly dependent on concentration in the range that is of interest in the growing of crystals and therefore in the embodiment to be described this change of viscosity is used to control the rate of addition of solute so as to tend to maintain a constant viscosity, and therefore concentration of solution.

The invention will be better understood from the following description of one embodiment taken in conjunction with the accompanying drawings, in which.

Figure 1:
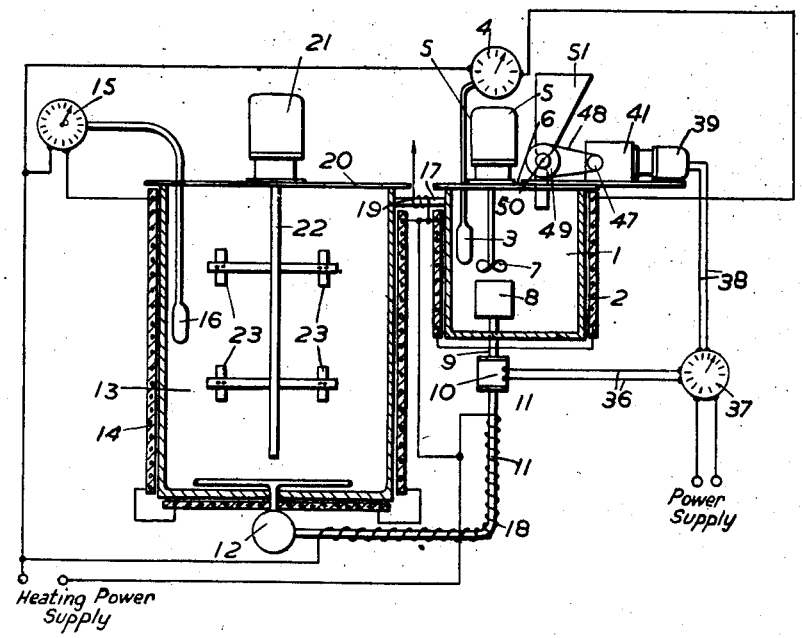
Fig. 1 shows the crystal growing equipment in schematic form.

In Fig. 1 there is shown a dissolving tank 1 which when in use is filled with a solution of the material which is to be crystallized. The solution is kept at a constant temperature by means of heating jacket 2 consisting of heating resistance wires embedded in a suitable insulating material such as woven asbestos fibre. Within the tank 1 there is mounted a thermostat 3 which operates an indicator controller 4 in which there is incorporated a relay which opens and closes the heating circuit thus maintaining the temperature of the solution at a constant value in well known manner. A suitable temperature in the case of ethylene diamine tartrate is 50° C. for a solution which would be saturated at 45° C.

It should be pointed out that the temperature of the solution is consistently maintained somewhat above that at which the solution would be saturated. This is of importance as in ensures that any new solid solute added to the solution is readily dissolved, so that no solid particles remain in suspension.

A continuously running motor 5 mounted on the lid 6 of tank 1 drives a stirrer 7 to keep the solution thoroughly mixed and facilitate rigid solution of newly added solutue. The solution leaves tank 1 through filter 8 and passes along pipe 9 to the viscosity meter 10 the purpose of which is explained later and then along pipe 11 to the motor driven pump 12 which pumps the solution into the crystal growing tank 13 as shown. The growing tank 13 is maintained at a constant temperature by means of the externally applied heating jacket 14, the supply of heating current being regulated by indicator controller 15, actuated by a thermostat 16 in the same manner as in the case of the dissolving tank 1. The solution flows from the tank 13 back into tank 1 through the overflow pipe 17 which completes the circulating system.

The pipes 11 and 17 are provided with heating jackets 18, 19 so that they can be maintained at temperatures such that no unwanted crystallisation from the solution will occur owing to local cooling.

This is of particular importance when the solution contained in the system is allowed to cool.

Mounted on the lid 20 of tank 13 there is a motor 21 which slowly rotates a spider structure 22 on the arms of which are mounted seed crystals 23. It is to be understood that the number of arms at each level of the spider, and the number of levels, depend on the size of the growing tank and the size of the crystals it is desired to grow. In the figure only two levels are shown each having two arms but in practice the spider is so constructed that a large number of crystals can be grown at one time.

It is preferable that the spider should be rotated firstly for a few turns in one direction and then a few turns in the reverse direction as this bathes the growing crystals evenly. This can be arranged either mechanically or electrically. An essential feature is that the concentration of the solution in the dissolving tank 1 should be kept constant and somewhat below saturation point.

As the crystals increase in size in the growing tank they retain more and more of the solute and the larger the crystals become the more rapidly they deplete the solution.

In order to keep the solution in tank 13 at a constant concentration it is therefore necessary to replenish the solution in the dissolving tank with additional solute substantially, continuously and at a rate controlled by the actual existing concentration.

A property of the solution which is suitable for indicating the concentration at a given temperature is its viscosity. There are several forms of viscometer operating on the principle that when a cylinder is axially rotated in the solution the drag, or resistance to rotation, is determined by the viscosity of the solution, and in fact the drag varies rapidly with small changes of viscosity providing the speed of rotation has been suitably chosen. The drag on the rotating cylinder can be measured in several ways such as, for example, by measuring the electric power consumed by the motor rotating the cylinder or by a dynamometer method of measuring the torsion of a somewhat elastic shaft connecting the driving motor to the rotating cylinder. The viscometer incorporated in the feed piping shown at 10 in Fig. 1 is used to control the supply of fresh solute as will now be described.

Figure 2:
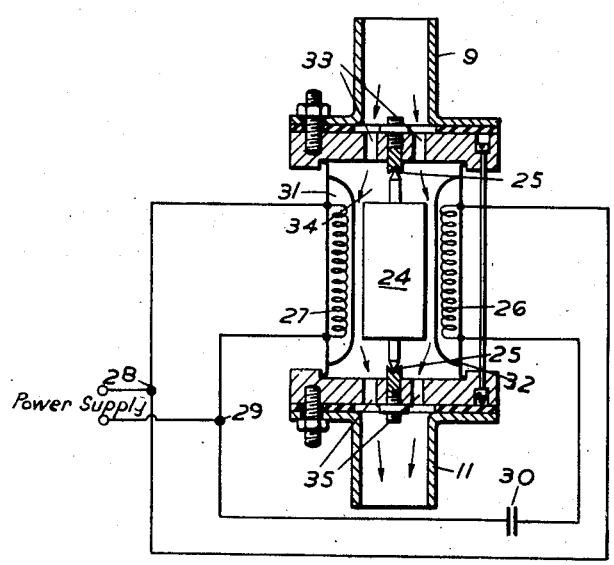
Fig. 2 shows partly in section, a viscosity meter used with the equipment.

The viscometer 10 shown in Fig. 1 may be of the kind illustrated in Fig. 2 in which a rotatable metallic cylinder 24 supported in bearings indicated at 25 is caused to rotate by alternating current from a suitable supply applied to the field windings 26, 27 from the power supply terminals 28, 29, the supply to winding 26 being out of phase on account of the inclusion of capacitor 30 in its circuit. The field windings 26 and 27 and the rotatable cylinder 24 together form a split phase A. C. motor and the rotor will rotate when current flows through the windings. The windings 26 and 27 are enclosed in compartments 31, 32. The complete viscometer is inserted in the pipe line as shown at 10 in Fig. 1 and the solution enters from pipe 9 through ducts 33 and passes through chamber 34, as indicated by the arrows around the rotor 24 and out through ducts 35 into the continuation of the pipe-line 11. The compartments 31 and 32 which enclose the field windings 26 and 27 are hermetically sealed to present the penetration of the solution. In the viscometer shown the rotor 24 is free to rotate in its bearings 25 and the drag indicating the viscosity can readily be determined by measuring the power in watts necessary to maintain the rotation of the cylinder 24, but, as stated above, the indication of viscosity can be arrived at by other means.

Returning now to Fig. 1 it will be seen that there are shown leads 36 connecting the viscometer 10 to a schematically indicated component 37 which will be referred to as the feed supply controller. This controller has a relay incorporated in it controlling a reversing switch which serves to reverse the supply current in leads 38 which current drives the slow running reversible motor 39. Reference should now be made to Fig. 4 where the motor 39 is shown as driving a lead screw 40 which forms part of an infinitely variable gear box generally designated as 41. A slow running motor 42 drives a disc member 43 forming part of the variable gear box which also includes a disc member 44 which is the driven member. A friction disc 45 freely mounted on the lead screw 40 engages the surfaces of both disc members 43 and 44. The disc member 45 is held in position on the lead screw 40 by two threaded collars 46 which engage the lead screw. The collars are prevented from rotating with the lead screw by forked projections forming parts of the collars and glidably engaging a fixed bar running the length of the gear box 41. These projections and bar are not shown in the drawing. Disc member 44 drives a set of belt pulleys 47 which are connected by a belt 48 to another set of belt pulleys 49 the rotation of which drives the feed rotor 50 in hopper 51 also shown in Fig. 3. It can now be seen that the speed with which the feed rotor 50 is driven is under the control of the infinitely variable gear box 41, the setting of which is determined by the rotation of the reversible motor 39. This in its turn is controlled by the feed supply controller 37 in accordance with the viscosity of the solution as determined by the viscometer 10.

Hopper 51 is kept supplied with the solute, preferably in the form of a finely divided powder, and as can be seen the quantity of solute added to the solution in dissolving tank 1 will be determined by the viscosity of the solution passing out of the tank so that a constant concentration at the given temperature is assured.

Figure 3:
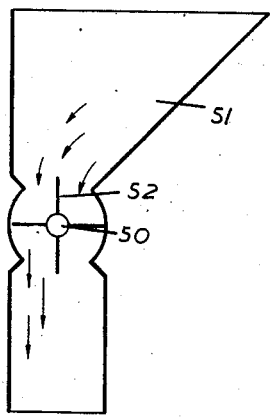
Fig. 3 shows in simplified form the mechanism for feeding the solute into the dissolving tank.
Figure 4:
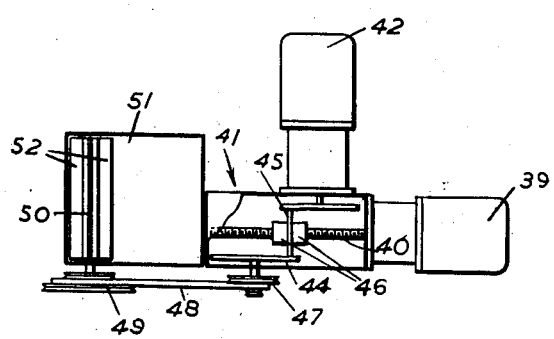
Fig. 4 shows details of the feeding mechanism.

The feed rotor 50 need not consist of four single blades 52 as shown in Figs. 3 and 4 but can be provided with a greater number of blades to ensure that the solute is added in small quantities, and by subdividing the rotor into compartments staggered longitudinally the feed can be made substantially continuous although still accurately controlled.

The embodiment of the invention described above refers in particular to the formation of crystals of ethylene diamine tartrate but it is to be understood that this embodiment is described for example only and that the invention is applicable to the process of growing crystals in all cases in which there is an advantage to be obtained by controlling the temperatures of a dissolving chamber and a growing chamber in the manner described.

While the principles of the invention have been described above in connection with specific embodiments, and particular modifications thereof, it is to be clearly understood that this description is made only by way of example and not as a limitation on the scope of the invention.

What is claimed is:

1. Method of growing crystals at constant temperature in a supersaturated solution by circulating a solution between a growing container in which crystals are grown and a dissolving container maintained at a higher temperature than that of the growing container, which method is characterised by the maintenance of said dissolving container at a constant temperature sufficiently high to keep the solution therein appreciably below saturation, measuring the concentration of the solution entering the growing container, and controlling the addition of solute to the dissolving container in accordance with such measurement.

2. Method according to claim 1, in which the measuring of the concentration of the solution entering the growing container is effected by measuring the viscosity of this solution, and in which the control of the addition of solute to the dissolving container is effected in accordance with the measurement of such viscosity.

3. Apparatus for growing crystals comprising a dissolving tank and a growing tank, each tank adapted to contain a crystal-growing solution of a different saturation level, means for suspending seed crystals in said growing tank, fluid communicating means interconnecting said tanks for circulating said solution therebetween, and means for controlling the saturation levels of said solution in both of said tanks comprising: heating means for separately heating each of said tanks, a pair of temperature-responsive control devices, one of said devices associated with said dissolving tank and the other of said devices associated with said growing tank, both of said devices coupled to said heating means to control same, whereby the temperature of the solution in said dissolving tank is maintained sufficiently high to keep it at a substantially constant sub-saturated level and the temperature of the solution in said growing tank is maintained to keep it at a supersaturated level, concentration-measuring means for constantly measuring the concentration of the solution in said dissolving tank, and means for supplying solute to said dissolving tank under control of said measuring means comprising a feeding mechanism, a continually running motor, an infinitely variable gearing connecting the motor to the feeding mechanism, and means controlling the setting of said gearing in accordance with the concentration of the solution.

ARTHUR JAMES WARNER.
STANLEY GEORGE FOORD.

References Cited in the file of this patent

UNITED STATES PATENTS

| Number | Name | Date |
| --- | --- | --- |
| 1,577,555 | Beadle | Mar. 23, 1926 |
| 1,789,386 | Kalle | Jan. 20, 1931 |
| 2,204,180 | Gerlach | June 11, 1940 |
| 2,459,869 | Christensen et al. | Jan. 25, 1949 |